(12) United States Patent
Lettington

(10) Patent No.: US 7,154,650 B2
(45) Date of Patent: Dec. 26, 2006

(54) SCANNING APPARATUS

(75) Inventor: Alan H. Lettington, Berkshire (GB)

(73) Assignee: Farran Technology Limited, Cork (IE)

( * ) Notice: Subject to any disclaimer, the term of this patent is extended or adjusted under 35 U.S.C. 154(b) by 0 days.

(21) Appl. No.: 10/919,052

(22) Filed: Aug. 16, 2004

(65) Prior Publication Data
US 2005/0122556 A1  Jun. 9, 2005

(51) Int. Cl.
*G02B 26/10* (2006.01)
(52) U.S. Cl. .................. 359/201; 359/226; 343/758
(58) Field of Classification Search ............ 359/201, 359/220, 226; 343/758, 765
See application file for complete search history.

(56) References Cited

U.S. PATENT DOCUMENTS

| | | | | |
|---|---|---|---|---|
| 4,042,933 A | * | 8/1977 | Lapp | 343/761 |
| 4,871,904 A | * | 10/1989 | Metlitsky et al. | 235/462.38 |
| 4,923,263 A | * | 5/1990 | Johnson | 359/220 |
| 5,555,125 A | * | 9/1996 | Peng | 359/203 |
| 6,587,246 B1 | * | 7/2003 | Anderton et al. | 359/212 |

* cited by examiner

*Primary Examiner*—Mark A. Robinson
(74) *Attorney, Agent, or Firm*—Clifford A. Poff

(57) ABSTRACT

Scanning apparatus operable in the microwave, mm-wave and infrared ranges and comprises a support structure, a first reflective disc or mirror (10) which is mounted in said support structure for rotation relative to the support structure about a first axis (14), and a second reflective disc or mirror (12) which is mounted in said support structure for rotation relative to the support structure about a second axis (16) and driving means for said discs or mirrors arranged to drive these in respective opposite senses. In operation of the apparatus, radiation from a scene being scanned reaching a reflective surface of the first disc or mirror is reflected thereby onto a reflective surface of the second disc or mirror, to be reflected by the latter, in turn, onto the reflective surface of the first disc or mirror again, to be reflected from the first disc or mirror into or onto a further part of the apparatus incorporating a receiver or receivers for such radiation. The reflective surface of the first disc or mirror has an axis of rotational symmetry, tilted at a first small angle relative to said first axis and the reflective surface of the second disc or mirror has an axis of rotational symmetry tilted at a second angle relative to said second axis. The driving means for the discs or mirrors is arranged to drive these in such a way as to effect a substantially linear scan. the size of said second angle relative to said first angle being selected so as to reduce or eliminate pupil wander in the direction orthogonal to the direction of line scan.

9 Claims, 4 Drawing Sheets

SCANNING APPARATUS

THE PRESENT INVENTION relates to a scanning apparatus operable in the infrared, mm-wave or microwave ranges of electromagnetic radiation. It is an object of the present invention to provide an improved scanning apparatus operable with radiation of the wavelengths indicated, having a large effective aperture and which is able to repeatedly scan, at a high rate, a two-dimensional (e.g. altitude and azimuth) field of view, and which yet can be constructed at reasonably low expense.

In mm-wave TV rate imaging, there is a requirement to scan a large aperture in a linear, or substantially linear, scan pattern in the scene. Such an aperture may be as large as 1 m in order to obtain adequate spatial resolution in the scene. The maximum angular resolution, $\alpha$, of an imager is given by $\alpha = \lambda/D$ where $\lambda$ is the wavelength and D is the width of a rectangular aperture.

When $\lambda$ is small, i.e. $5 \ast 10^{-7}$ m, as in the visible region, the aperture D required for good resolution is small, but when the wavelength is larger, i.e. $3 \ast 10^{-3}$ m, as in the mm-wave region then the width of the aperture has to be comparably larger to obtain similar angular resolution.

In the infra-red region a linear scan mechanism typically consists of either a rotating polygon or a flapping mirror. In the mm-wave region a similar rotating polygon would be far too massive, requiring faces the order of 2 m in width. In the mm-wave region, a flapping mirror 1 m in size would be difficult to reciprocate at TV rates. (For present purposes a scan providing as little as 10 frames per second, or even less, is regarded as being at TV rates).

It is known that a linear scan can be obtained using two rotating reflective flat discs each mounted for rotation about an axis inclined to the plane of the disc, and arranged so that light from the scene being scanned falls first onto one such disc, is reflected thereby onto the other disc and thence reflected onto a receiver or sensor, the two discs being inclined at the same angle to their respective axes of rotation and being rotated in opposite directions.

This arrangement does not, however, lead to a compact design and there is high pupil wander.

In accordance with the present invention, there is provided scanning apparatus operable in the microwave, mm-wave and infrared ranges and comprising a support structure, a first reflective disc or mirror which is mounted in said support structure for rotation relative to the support structure about a first axis, a second reflective disc or mirror which is mounted in said support structure for rotation relative to the support structure about a second axis, the arrangement being such that radiation from a scene being scanned can reach a reflective surface of the first disc or mirror to be reflected thereby onto a reflective surface of the second disc or mirror, to be reflected by the latter, in turn, onto said reflective surface of the first disc or mirror again, to be reflected from the first disc or mirror into or onto a further part of the apparatus incorporating a receiver or receivers for such radiation and wherein said reflective surface of the first disc or mirror has an axis of rotational symmetry, (or a normal where said surface is planar) tilted at a first small angle relative to said first axis and wherein said reflective surface of the second disc or mirror has an axis of rotational symmetry (or a normal where said surface is planar) tilted at a second angle relative to said second axis, and driving means for said discs or mirrors arranged to drive these in respective opposite senses, such as to effect a linear, or substantially linear, scan, the size of said second angle relative to said first angle being selected so as to reduce or eliminate pupil wander in the direction orthogonal to the direction of line scan. It will be appreciated that the requirement for a linear scan, in relation to the invention should be regarded purposively, rather than as a strict mathematical requirement. Thus, for example, it is not intended to exclude scans which, mathematically, are in the form of severely flattened loops rather than geometrically straight lines, if the departure from strict linearity would not be perceptible, or would not be obtrusive, in practice. References herein to linear scans are to be understood accordingly.

The present invention makes it possible to manufacture a system for providing multiple linear scans, in a compact arrangement that is suitable for use in high-speed mm-wave and microwave applications.

Embodiments of the invention are described below with reference to the accompanying schematic drawings in which:—

Figure 1:
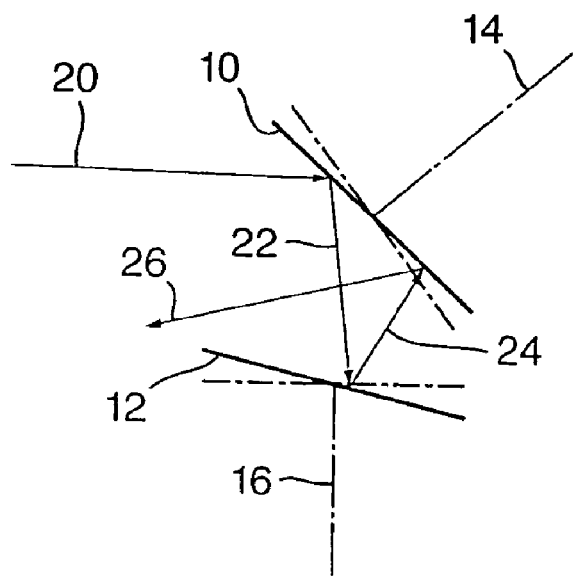
FIG. 1 is a schematic plan view representing part of a first embodiment of the invention.

In the scanning apparatus, embodying the invention, described below, the apparatus in each case uses two rotating reflective discs or mirrors, mounted for rotation in a fixed support structure which is not shown in the drawings, such fixed structure being in general fixed with respect to the scene to be scanned.

Figure 2:
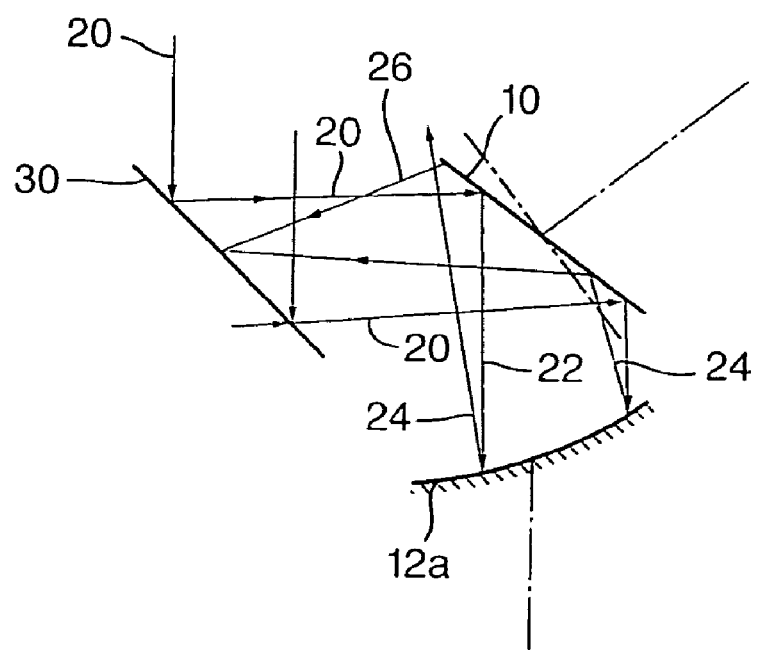
FIG. 2 is a view, similar to FIG. 1, illustrating a variant.

Referring to FIG. 1, in which these discs or mirrors, referenced 10 and 12 in the drawings, are mounted for rotation about respective axes 14 and 16, the rotary axis of each disc 10, 12 passes through its centre and each disc 10, 12, is tilted slightly with respect to its rotary axis so that where the discs have planar reflective surfaces, as in FIG. 1, the normal to the plane of the reflective surface of each disc is inclined slightly with respect to the respective rotary axis, and where such a mirror is a concave mirror, as in FIG. 2 (see below) the rotary axis is inclined with respect to the primary optical axis of the mirror. These two discs 10, 12 rotate with the same speed (angular velocity) but in opposite directions.

Radiation from the scene being scanned (arrow 20) is incident at the first tilted rotating disc 10 and is reflected therefrom (arrow 22) towards the second tilted rotating disc 12. The radiation striking the second disc 12 is reflected (arrow 24) from the second disc back to the first disc 10, after which it passes (arrow 26) to the rest of the imaging system and is detected.

This arrangement produces a linear scan. The direction of this linear scan pattern depends on the initial "phase difference" between the rotating discs.

That is to say, if disc 10, for example, were in a predetermined position relative to said fixed structure, the direction of line scan relative to the fixed structure would be different for different angular positions, about its axis 16, of the disc 12 relative to the fixed structure. For convenience, the angle of the second disc 12 about its axis 16, when the disc 10 is in such (arbitrary) predetermined position, is referred to herein as the phase difference. For a given phase difference, in this sense, there is a specific angle of tilt of one disc relative to the plane which is perpendicular to the axis of that disc, (and for a given angle of tilt of the other disc), for which, in a direction orthogonal to the line scan direction the beam is reflected from the second disc back along its incident direction. That is to say, there is a plane parallel with the direction of line scan, such that a ray in such plane, reaching the first mirror will, after reflection from the mirror to the second and from the second back to the first, be reflected back in such a plane, for a range of angles of incidence in that plane. There is, therefore no pupil wander in the direction orthogonal to the direction of scan. As Will be appreciated from the above, the tilt of the second disc 12 with respect to its axis 16 (for a given tilt of the first disc 10), depends on the intended direction of scan. By way of example, in a case in which the axes 14, 16 lie in a common plane, when the scan direction is perpendicular to the plane containing axes 14 and 16, then the tilt of the second disc 12 with respect to its axis 16 should be twice that of the first disc 10 with respect to its axis 14. Thus, in this case, if the first disc is tilted by an angle, $\theta$, then the second disc is tilted by an angle $2\theta$. In a case in which, (again with the axes 14, 16 lying in a common plane), the scan direction is in the plane containing axes 14 and 16, then the tilt $\alpha$ of the disc 12 and the tilt $\theta$ of the first disc 10 should satisfy the equation $\alpha=2\theta.\cos\phi$ where $\phi$ is the angle of the axis 14 of disc 10 relative to axis 16 of disc 12.

With an apparatus in accordance with the invention, the footprint of the incident radiation moves slightly across the surface of the first disc as the scene is scanned, but there is a stationary effective virtual pupil behind the first disc at the position of the image of the second disc reflected in the first disc. The radiation reflected by the first disc after having been directed onto the first disc from the second disc may be relayed to another scanning mechanism, for example arranged to provide a scan at right angles to the line scan, (e.g. as a 'field scan", to provide, with the line scan, a scanning raster).

In a variant arrangement illustrated in FIG. 2, in which parts like to parts in FIG. 1 have like references, the second reflective disc (reference 12a) may have a concave reflective surface so as to form an image of the scanned scene at the location of a single receiver or of a receiver array, which image is scanned past the receiver or receiver array.

More particularly, the scanning arrangement described with reference to FIG. 1 or FIG. 2 may be used with a linear receiver array, the array being perpendicular to the direction of scan, so as to achieve a two dimensional image. To minimise pupil wander in the arrangement of FIG. 2, the central beam reflected from the first disc should be incident normally (axially) on the concave mirror, (such central beam emanating from the centre of the field of view scanner).

The incident and reflected beams at the scanner may be separated using an inclined plane mirror 30 with a central hole 32 as illustrated in FIG. 2, so that radiation from the scene being viewed is reflected by mirror 30 onto mirror disc 10, whilst the radiation reflected from mirror 10 towards mirror 30 and converging onto an axis extending through hole 32, passes through hole 32 to a an optical and/or receiver system behind the mirror 30. The inclined mirror 30 may be used to perform a slow 'field' scan of the scene in a direction orthogonal to the direction of the scan produced by the rotating discs 10,12. To this end, the mirror 30 may be tilted or swung periodically through a limited angle, at an appropriate rate synchronised with mirrors 10, 12, to produce an appropriate scanning raster.

In a further variant, illustrated in FIG. 3, a rotating disc scanner employing plane rotated tilted mirror surfaces as described with reference to FIG. 1, is combined with a polarizing wire grid 40 and a Faraday rotator or quarter wave plate 42 to form a particularly compact scanning system. In this variant, as illustrated, the receiving arrangement used may comprise, as shown a linear array of receivers 30, the array being perpendicular to the direction of line scan effected by the rotating discs 10, 12.

Figure 3:
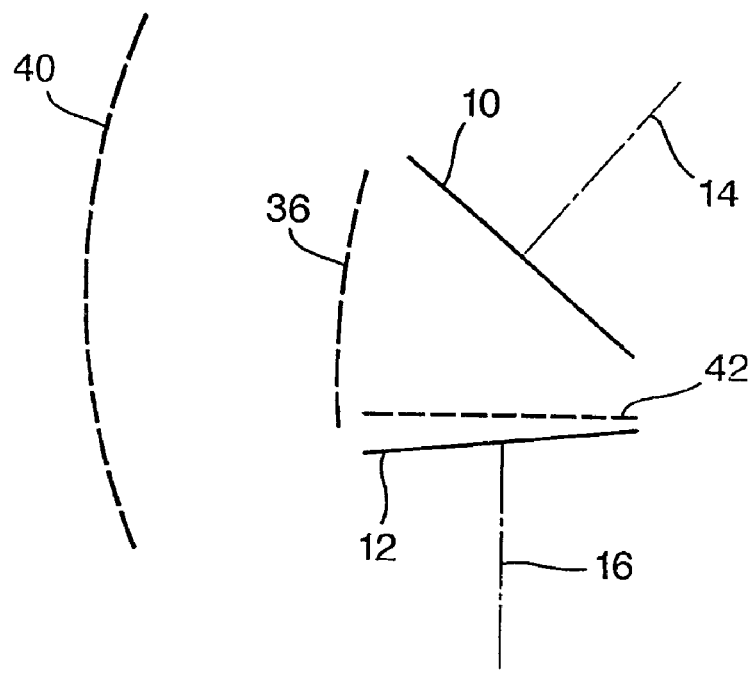
FIG. 3 is a view, similar to FIG. 1, illustrating a further variant.

In operation of the arrangement of FIG. 3, radiation from the scene scanned, having a particular polarization, passes through the wire grid polarizer 40 and is reflected at the first tilted mirror disc 10. This reflected radiation passes through the Faraday rotator (or quarter wave plate) 42 and is reflected at the second rotating disc 12, back towards the first disc, passing again through the Faraday rotator (or quarter wave plate) 42. When this radiation is reflected again at the first rotating mirror disc 10, its direction of polarization has been rotated through 90 degrees with respect to that which has passed through the polarizer 40 and is therefore now reflected by the wire grid 40 to form an image at the curved image surface along which the receivers 36 are arranged.

To minimise aberrations this wire grid polarizer 40 may have a spherical surface, the centre of curvature being at the centre of the virtual pupil of the rotating disc scanner.

One rotation of the scanner discs scans the scene forwards and backwards potentially allowing 2 TV lines (raster lines) per receiver 36.

Figure 4:
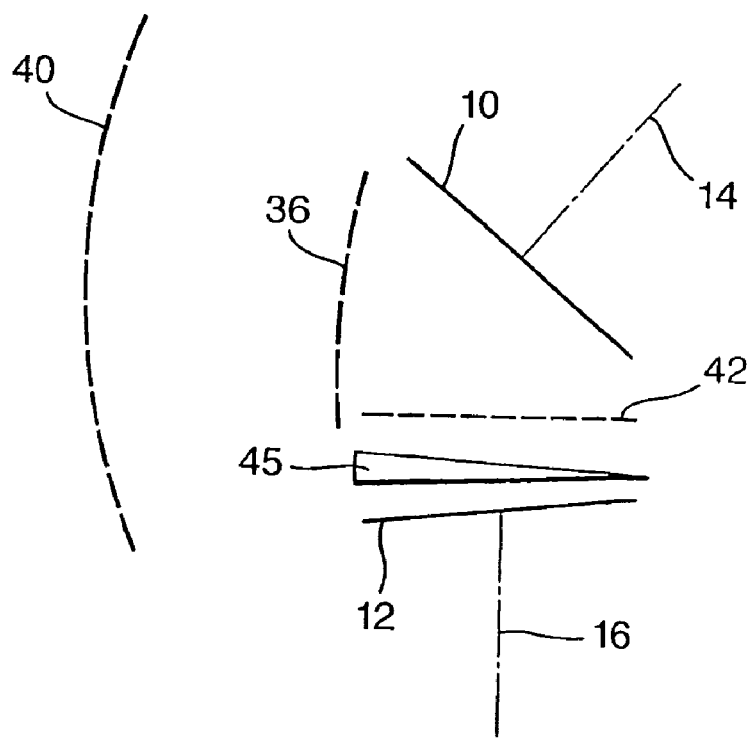
FIG. 4 illustrates a variant of the apparatus of FIG. 3.

It is an advantage if the number of receivers is kept to a minimum, since they are expensive items. As shown in FIG. 4, receivers 36 may form a sparse linear array and a thin rotating prismatic disc 45 (i.e. a disc in the form of thin prism, and in which the operative faces of the prism form the opposite faces of the disc), mounted in the beam between the first and second rotating discs (10, 12) and close to the second disc 12 may be used to perform a microscan, this disc 45 being substantially perpendicular to the rotary axis of the mirror 12 and being rotated about that axis. The arrangement illustrated in FIG. 4 is a variant of that illustrated in FIG. 3 and in FIG. 4 parts corresponding to parts in FIG. 3 have corresponding references.

Figure 5:
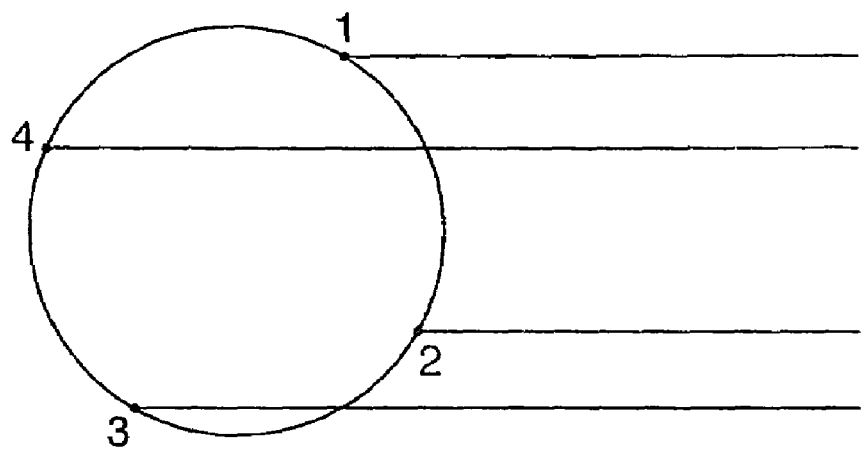
FIG. 5 illustrates a variant of the apparatus of FIG. 4.

In the arrangement of FIG. 4, the rotating thin disc or prism 45 also produces scanning displacement parallel with the line scan direction, but this can be removed in subsequent scan conversion electronics which also correctly order the lines of the scanning raster. If the microscan disc 45 in the arrangement of FIG. 4 rotates at a quarter of the speed of the other two discs (10, 12) then a four fold microscan is achieved. This is illustrated in FIG. 5. With such a four fold microscan, the number of raster lines (TV lines) is eight times the number of receivers 36. In general, if this microscan rotating prism or wedge 45 rotates at a speed of 1/x of the speed of the main discs 10, 12 where x is an integer, there are 2xN raster lines (TV lines) where N is the number of receivers 36 in the linear array.

This type of microscan mechanism may be used with other optomechanical scanners.

Figure 8:
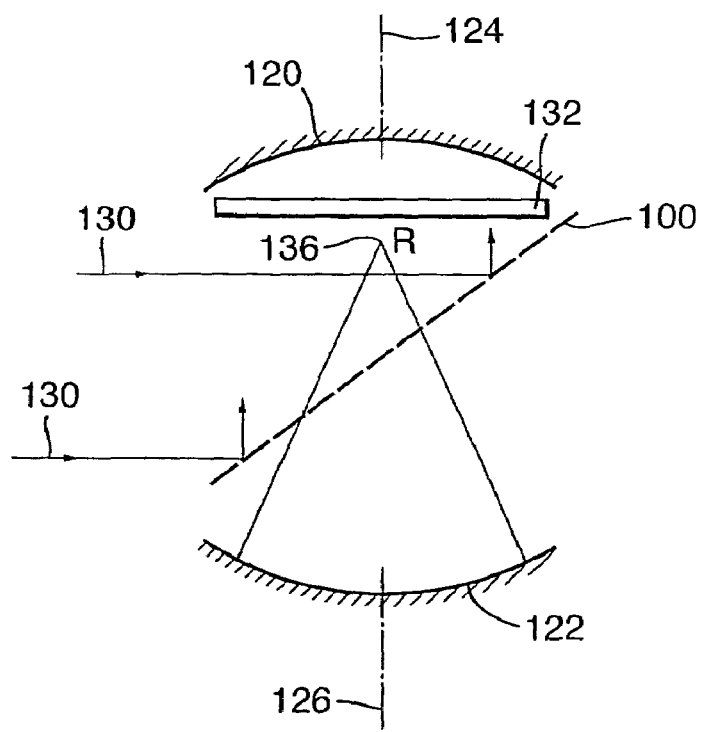
FIG. 8 is a schematic view of yet another embodiment of the invention.

Referring to FIG. 8, another design of scanning apparatus or imager, for use in the millimeter wave band, employs a wire grid polarizer 100 as a 45 degree fold mirror. The polarizer 100 is disposed between two concave rotating mirrors. 120,122 which are arranged with their concave sides facing towards one another. These mirrors have axes of rotation 124 and 126 which are inclined slightly with respect to the optical axes of the respective mirrors 120, 122, i.e. with respect to the axes about which the reflective surfaces of these mirrors have rotational symmetry. The two concave mirrors 120,122 rotate about their axis 124, 126 at the same speed but in opposite directions. Whilst in FIG. 8 these axes 124, 126 are shown as vertical, they need not be so. Furthermore, as illustrated, these axes may be coincident, although, again, they need not be.

In operation of the apparatus of FIG. 8, radiation (represented at 130) from the scene scanned reflects from the wire grid polarizer 100 and passes through a Faraday rotator, (or meander line) 132. The radiation then reflects from mirror 120 and passes back through the Faraday rotator (or meander line) 132. In passing thus twice through the Faraday rotator (or meander line), the radiation has its direction of polarisation rotated by 90 degrees. The radiation now falls onto concave mirror B. The radiation is then brought to a focus at a receiver array 136, for example after passing again through the wire grid polarizer 100. As described in relation to preceding embodiments, the receiver array may be a linear receiver array, such as is described above as being suitable for use in relation to the embodiments of FIG. 1 or FIG. 2, or a further slowly oscillating (field scan) mirror may be used to present each line scan in turn to a single receiver or to present groups of scan lines in turn to a limited number of receivers, as likewise described above.

Figure 6:
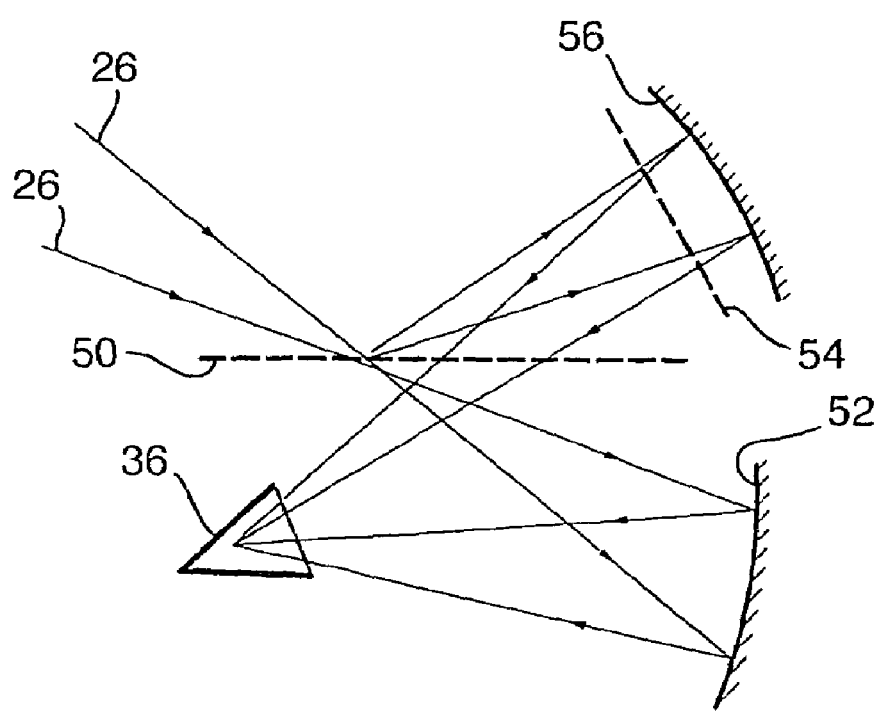
FIG. 6 illustrates an arrangement for improving the effectiveness of a polarisation-sensitive radiation detector and which may be used in scanning apparatus embodying the invention.

In the first two embodiments (FIGS. 1 and 2) the radiation from the scene arriving at the receivers is unpolarised. In general, receivers for mm-wave and microwave radiation are sensitive to only one direction of polarization and as a result radiation polarised perpendicular to the direction to which such receivers is sensitive is not detected, i.e. where the incident radiation from the scene scanned is unpolarised, half of the energy of the incident radiation is not detected. The signal to noise ratio at the output of such a receiver or detector would be increased by a factor of two, or the scan speed could be increased by a factor of four, if both directions of polarization could be detected. This can be achieved in the arrangement illustrated in FIG. 6. The arrangement of FIG. 6 may form part of the apparatus which receives the radiation from the scanning arrangement illustrated in FIG. 1 or FIG. 2, i.e. which is reflected from mirror 10 after reflection from mirror 12, and the arrangement of FIG. 6 is thus interposed between that scanning arrangement and the receiver or receivers, (i.e. radiation detector or detectors 36). Thus, in the arrangement shown in FIG. 6, before reaching the receiver 36, the radiation encounters a polarizing beam splitter 50 (e.g. comprising a grid of parallel elongate conductors) which allows radiation with a polarization direction corresponding to, and close to, a first direction to pass through and reflects radiation with a polarization direction corresponding to, and close to, a second direction perpendicular to said first direction. The radiation which initially passes through beam splitter 50 proceeds to a focussing mirror 52 which focuses that radiation on to receiver 36. The radiation initially reflected from the beam splitter is directed through a quarter wave plate or Faraday rotator 54, to a focussing mirror 56 which reflects the radiation back through the quarter wave plate of Faraday rotator 54 once again (after which, of course, the polarization direction has been shifted by 90°) and passes through the polarizing beam splitter (having now the appropriate polarization to do so) to the receiver 36.

Alternatively, the focussing mirror 56 may be a twist reflector, making it possible to dispense with the need for the quarter wave plate or Faraday rotator 54.

Figure 7:
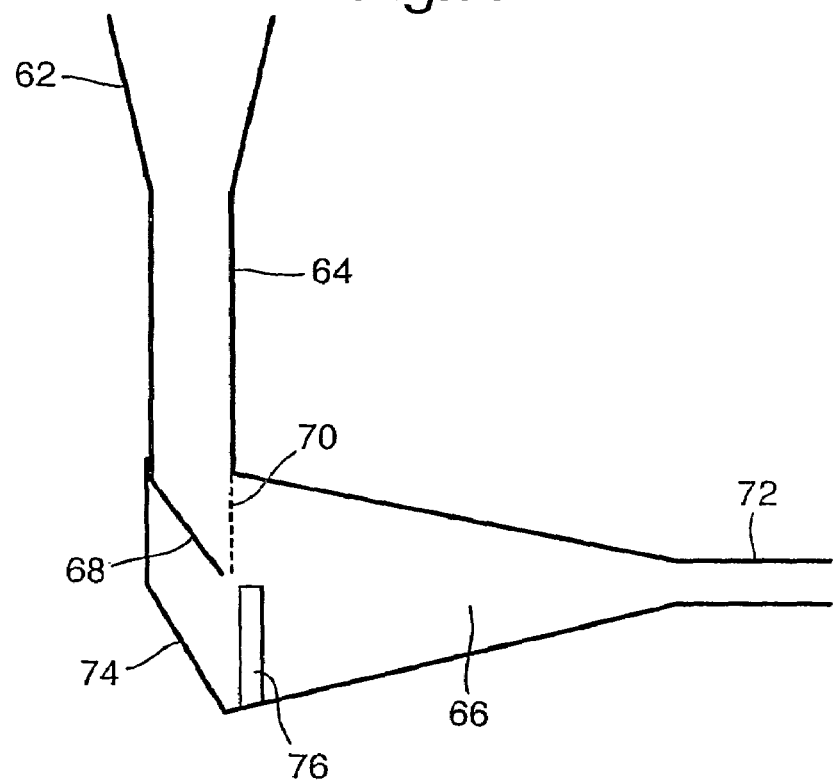
FIG. 7 is a schematic sectional diagram illustrating a polarising waveguide arrangement which may be used in conjunction with scanning apparatus embodying the invention.

An alternative arrangement to achieve the same effect as in FIG. 6 may be achieved in a waveguide as illustrated in FIG. 7, disposed to receive the radiation reflected from the rotating discs, eg. to receive the reflected beam 26 in FIG. 1. Thus, in the arrangement of FIG. 7, a square cross-section horn 62 arranged to receive the radiation from the rotating discs 10,12 is connected to and merges with a square cross-section waveguide 64 and feeds radiation into a combined chamber and horn 66 in which is mounted a first wire grid polarizer 68 arranged to reflect radiation polarised parallel to the plane of the drawing (and which radiation will be referred to herein for convenience as being horizontally polarised). The polarizer 68 allows radiation to pass which is polarised in a direction from left to right in the plane of the drawing and which is referred to herein as being vertically polarised. The radiation reflected from the polarizer 68 passes in turn through a further wire grid polarizer 70 which further ensures that the radiation reflected by polarizer 68 is horizontally polarised. The radiation passing through the polarizer 68 is in turn reflected from an inclined end wall 74 and into a twisted guide 76 or similar device, for example using a Faraday rotator or quarter wave plates, to rotate the plane of polarization through 90 degrees. The polarised radiation emerging from device 76 passes into a length of wave guide and passes to a wave guide transition. It has the same direction of polarisation as the radiation reflected by polarizer 68 through the polarizer 70. These two vertically polarized beams are combined in a wave guide transition leading to another wave guide 72 feeding the radiation receiver or detector, (not shown). In a variant, the twisted guide 76 or similar device may be positioned to receive the radiation reflected by the wire grid polarizer 68 instead of that reflected by the reflector 74 and the radiation passing through the wire grid 68 may pass to reflector 74 and thence to the waveguide 72 and receiver, without change of its direction of polarisation, which in this variant is the same as the polarisation direction of the radiation emerging from the twisted guide.

Whilst it is possible, in order to minimise the number of (expensive) receivers 36, to derive successive 'lines' of a TV-type scanned (raster) image by effecting a 'field' scan (i.e. in a direction orthogonal to the line scan) relative to a single receiver, a higher scan rate in terms of 'frames' per second, can be achieved by providing a linear array of receivers such as illustrated in FIGS. 3 and 4 (receivers 26), the array extending perpendicular to the line scan direction so that the picture information for each line of the scanned image is provided by a respective receiver in the linear array of such receivers, each receiving radiation from a respective elevation in the field of view relative to the fixed structure. Preferably, a combination of these two approaches is adopted, using an array of a limited number of spaced apart receivers 36, each receiving a few (preferably adjacent) lines of the image, as a result of operation of a limited 'field scan' mechanism (e.g. such as the microscan mechanism described above), with the respective parts of the image "seen" by the different receivers being combined electronically to produce the full "video" picture.

The field scan or limited field scan may be effected in any of a variety of ways, e.g. using a reflector tilted in an oscillatory manner or a rotating drum provided with reflective facets, or a further pair of rotating reflecting discs similar to the discs 10, 12, shown in FIGS. 1 and 2, or by a rotating thin prism, etc.

As will be appreciated from the above, the invention provides a means of providing, at minimum expense, a two-dimensional "view" of a "scene" viewed in microwave, mm-wave or infrared radiation. Furthermore, the preferred forms of apparatus in accordance with the invention allow such a view to be obtained without excessive duplication of expensive receiving elements and without large and prohibitively expensive lens elements. The preferred embodiments of the invention also offer the advantage of compactness.

The invention claimed is:

1. Scanning apparatus operable in the microwave, mm-wave and infrared ranges and comprising a support structure, a first reflective disc or mirror which is mounted in said support structure for rotation relative to the support structure about a first axis, a second reflective disc or mirror which is mounted in said support structure for rotation relative to the support structure about a second axis, the arrangement being such that radiation from a scene being scanned can reach a reflective surface of the first disc or mirror to be reflected thereby onto a reflective surface of the second disc or mirror, to be reflected by the latter, in turn, onto said reflective surface of the first disc or mirror again, to be reflected from the first disc or mirror into or onto a further part of the apparatus incorporating a receiver or receivers for such radiation, and wherein said reflective surface of the first disc or mirror has an axis of rotational symmetry tilted at a first small angle relative to said first axis and wherein said reflective surface of the second disc or mirror has an axis of rotational symmetry tilted at a second angle relative to said second axis, and driving means for said discs or mirrors arranged to drive these in respective opposite senses, the arrangement being such as to effect a substantially linear scan, the size of said second angle relative to said first angle being selected so as to reduce or eliminate pupil wander in the direction orthogonal to the direction of line scan.

2. Scanning apparatus according to claim 1 wherein said further part of the apparatus includes means arranged to effect a field scan or partial field scan in a direction perpendicular to the direction of line scan.

3. Apparatus according to claim 2 in which the arrangement is such that such image is repeatedly scanned past such array whilst effecting a partial field scan such that each receiver receives, in succession, input for a succession of scanned lines of a scanning raster.

4. Scanning apparatus according to claim 1 wherein said further part of the apparatus includes a linear array of receivers, the apparatus being so arranged that, in effect, an image of the scene is scanned past the linear array in a direction substantially perpendicular to the direction in which that linear array extends.

5. Scanning apparatus according to claim 1 wherein at least one of said discs or mirrors has a concave reflective surface for focussing said radiation.

6. Scanning apparatus according to claim 5 wherein the arrangement is such that the radiation reflected by said first mirror from said second mirror passes in a direction substantially opposite to the direction of the radiation coming into the first mirror from the scene being scanned and wherein an apertured reflector is arranged in front of said first mirror to reflect incoming radiation from the scene being scanned onto said first mirror and the arrangement is such that the radiation reflected from said second mirror by said first mirror is focussed to pass through the aperture in the apertured mirror to said further part of the apparatus.

7. Apparatus according to claim 1 wherein picture information for each line of the scanned image is provided by a respective radiation receiver or sensor in an array of such receivers or sensors, each receiving radiation from a respective elevation in the field of view relative to said support structure.

8. Scanning apparatus according to claim 1 wherein a combined polarizing filter and focussing reflector is interposed between said first mirror or disc and the scene to be scanned, such that radiation reaching said first mirror to be reflected onto said second mirror is polarised in a first direction, and wherein a Faraday rotator or quarter wave plate is interposed between said first mirror and said second mirror, whereby the radiation reflected by the first mirror to the second mirror and by the second mirror back to the first mirror, is passed twice through said Faraday rotator or quarter wave plate and has thus had its direction of polarization rotated through 90° with respect to the radiation passing through the combined polarizing filter and focussing reflector towards said first mirror, such radiation, after reflection onto said first mirror from the second mirror being thereafter reflected by the first mirror towards the combined polarizing filter and focussing reflector, the apparatus including an array of polarization sensitive detectors (36) interposed between the first mirror (10) and said combined polarizing filter and focussing reflector (40) and oriented to be sensitive to polarised radiation reflected thereto from the combined polarization filter and focussing reflector (40).

9. Scanning apparatus operable in the microwave, mm-wave and infrared ranges and comprising a support structure, a first reflective disc or mirror which is mounted in said support structure for rotation relative to the support structure about a first axis, a second reflective disc or mirror which is mounted in said support structure for rotation relative to the support structure about a second axis, the arrangement being such that radiation from a scene being scanned can reach a reflective surface of the first disc or mirror to be reflected thereby onto a reflective surface of the second disc or mirror, to be reflected by the latter, in turn, onto a further part of the apparatus incorporating a receiver or receivers for such radiation, and wherein said reflective surface of the first disc or mirror has an axis of rotational symmetry, tilted at a small angle relative to said first axis and wherein said reflective surface of the second disc or mirror has an axis of rotational symmetry tilted at a small angle relative to said second axis, and driving means for said discs or mirrors arranged to drive these in respective opposite senses, and wherein said first and second reflective discs or mirrors are both concave mirrors, arranged with their concave sides facing one another and wherein a wire grid polariser is located between the mirrors inclined at an angle with respect to the two mirrors so as to receive radiation, from a scene being scanned, arriving transversely with respect to said first and second axes and to reflect a plane polarised component of such radiation towards said first mirror, and wherein a quarter wave plate or Faraday rotator is located between said first mirror and said wire grid polariser, whereby the radiation passing to said first mirror and reflected thereby towards said second mirror has its polarisation direction shifted through 90 degrees in passing twice through said quarter wave plate or Faraday rotator and can thus pass through said wire grid polariser to said second mirror to be focussed by said second mirror onto a radiation detector or receiver located between said first mirror and said second mirror.

* * * * *